BEST AVAILABLE COPY

BEST AVAILABLE COPY

2 Sheets—Sheet 1.

J. W. BOPE.

Harvester Dropper.

Reissued May 28, 1867.

No. 2,625.

Witnesses

A. B. Smith

Chas. Youngman

Inventor

J. W. Bope by his Attorney

Addison M. Smith

N. PETERS, Photo-Lithographer, Washington, D. C.

J. W. BOPE.

Harvester Dropper.

No. 2,625. Reissued May 28, 1867.

Witnesses
N B Smith.
[illegible]

Inventor
J. W. Bope
by his attorney
Addison M. Smith

N. PETERS, Photo-Lithographer, Washington, D. C.

UNITED STATES PATENT OFFICE.

JACOB W. BOPE, OF ST. LOUIS, MISSOURI.

IMPROVEMENT IN HARVESTERS.

Specification forming part of Letters Patent No. 45,906, dated January 17, 1865; reissue No. 2,625, dated May 28, 1867.

*To all whom it may concern:*

Be it known that I, JACOB W. BOPE, of St. Louis, county of St. Louis, and State of Missouri, have invented a new and useful Improvement in Droppers for Harvesters; and I do hereby declare that the following is a full, clear, and exact description of the construction and operation of the same, reference being had to the accompanying drawings, forming a part of this specification, in which—

Figure 1:
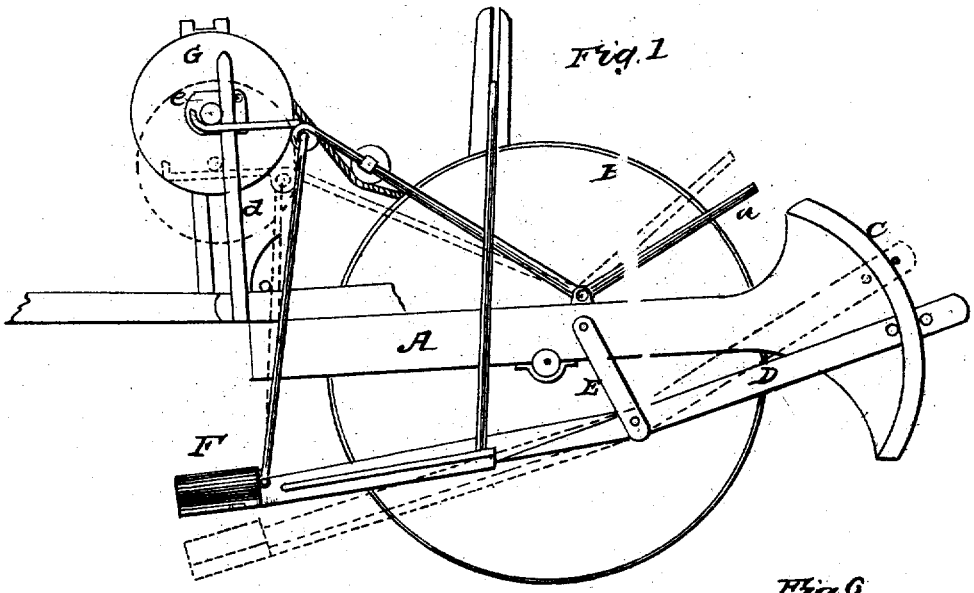
Figure 3:
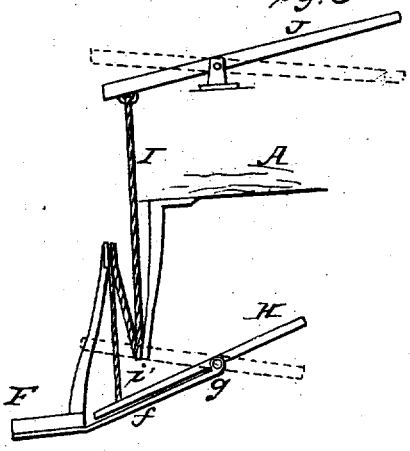
Figure 6:
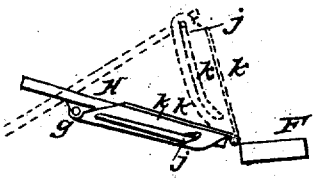
Figure 2:
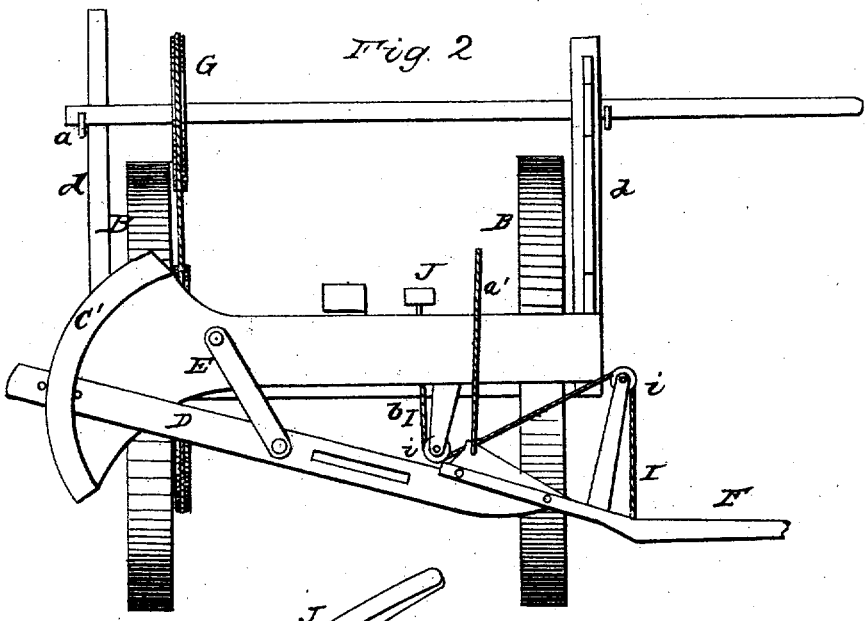
Figure 4:
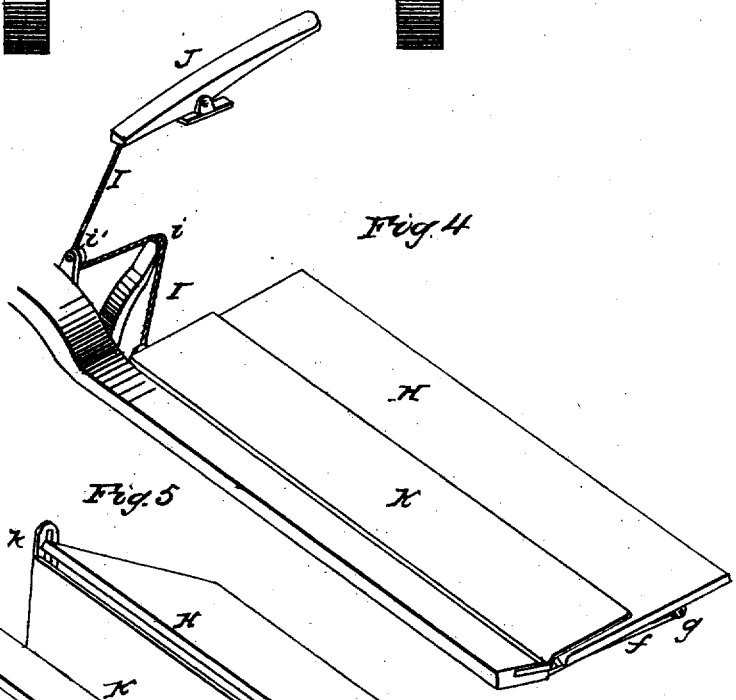
Figure 5:
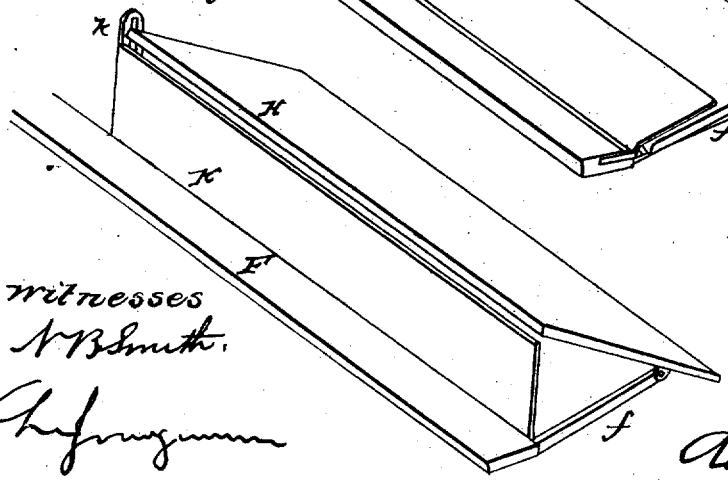

Figure 1 is a side elevation of a harvesting-machine, showing the arrangement of levers for raising the cutting apparatus, &c. Fig. 2 is a front view of the same. Fig. 3 is a side elevation of the finger-bar and tilting platform, and lever for operating said platform. Fig. 4 is a perspective view of the tilting platform in position to receive the falling grain. Fig. 5 is a similar view, with platform tilted to discharge the gavel; and Fig. 6 is an end view, showing the operation of the tilting platform and grain-guard.

Similar letters of reference indicate corresponding parts in all the figures.

My invention consists in hinging or pivoting a tilting platform, at a fixed point or points in rear of its forward edge, in an arm or arms which have no rear support, in such manner as to leave an unobstructed space in rear of the platform for the discharge of the grain upon the ground, and also in such manner as that the tilting of the platform to discharge the gavel shall interpose a cut-off to receive and support the falling grain while the completed gavel is being discharged. It further consists in combining a tilting platform, which turns upon a pivot in rear of its forward edge, with the cutting apparatus of a two-wheel side-draft machine. And it further consists in the employment of a shield or guard to close the opening between the forward edge of the tilting platform and the finger-bar, formed by the tilting of the platform on a pivot or hinge in rear of its forward edge.

To enable others to understand and use my invention, I will describe the same with reference to the drawings, in which—

A is the main frame; B B, the two driving or carrying wheels; C C′, slotted guides on the frame, in which the arm D and extension-bar D′ of the cutting apparatus F move; and E pivoted link-connections between the frame and arms or bars D D′, for controlling the movements of the finger and extension bars D and F when the cutting apparatus is raised and lowered. *a* is a lever pivoted to the main frame, and connected by link *a′*, or other suitable flexible device, to the finger-bar F, for the purpose of enabling the driver on the machine to raise and lower the cutting apparatus at will. Said lever *a* extends also underneath the reel-shaft *e* in such manner as to cause the reel, when the cutting apparatus and the parts connected thereto are raised and lowered, to rise and fall therewith, thereby maintaining a uniform relation of the reel to the cutting apparatus, as shown in Fig. 1. H is the tilting platform, on which the grain falls as it is cut, which may be made of smooth plank, or it may be a light, strong frame, having its upper surface covered with any suitable material. In rear of the forward edge of this platform are pivots or hinges *g*, having bearings in arms *f* which connect the tilting-platform to and support it in the rear of the finger-bar F. The point of pivot *g* should be placed far enough in the rear of the center of the platform H to make the preponderance of its weight forward, so that it will fall back to its position and rest on the arms *f* at all times when it is not tilted by the action of the chain or cord I passing over pulleys *i i*, connecting with the foot-lever J, by which the driver upon the machines operates it at will to discharge the grain in gavels. To the rear of the finger-bar F I attach as hield or guard, J, which may be made of sheet metal, and arranged to fold over the forward edge of the platform H so that it will be flat upon it, as seen in Fig. 4, when the platform is in the proper position to receive the grain. On the machine end of the guard K is a slotted bar, in which a pin, *j*, slides; the pin being attached to the platform H so that when the platform is tilted to drop the gavel said pin will lift the guard or shield and cause it to close the opening formed between the finger-bar and the platform, and thus effectually prevent grass or other extraneous matter from getting in between to choke up and prevent the platform from resuming its proper position to receive the grain.

From the foregoing it will be seen that the platform receives its connection with the main frame through the cutting apparatus only, and is pivoted, at a point in rear of its center, in arms or supports extending from and rigidly attached to the finger-bar, and which have no rear connection with the frame, in such manner as to leave an unobstructed space in rear of the platform for the discharge of the grain. By tilting the platform in the manner shown and described—that is, by raising its forward edge, thereby giving it the necessary degree of inclination to cause the grain to slide off upon the ground—the discharge of the grain is not liable to be interfered with by stumps or other obstacles over which it, together with the cutting apparatus to which it is attached, passes as the machine is drawn forward, while at the same time the forward edge of the platform thus elevated, or the shield or guard, in case it is used, serves as a cut-off to receive and support the falling grain while the completed gavel is being discharged.

What I claim, and desire to secure by Letters Patent, is—

1. A tilting platform turning upon a pivot in rear of its forward edge, and connected to the main frame of the machine through the medium of the finger-bar only.

2. A tilting platform having a fixed pivotal bearing at its outer or grain end, and in rear of its forward edge in an arm or support which is attached to the finger-bar, and has no rear support from or connection with the main frame.

3. A tilting platform vibrating upon a fixed pivot in rear of its forward edge, in combination with the cutting apparatus and main frame, in such manner as to leave an unobstructed space in rear of said platform for the delivery of the grain upon the ground.

4. A cut-off for separating the falling grain from the completed gavel on the platform, interposed by the tilting of the main platform upon a fixed point or pivot in rear of its forward edge.

5. A platform which discharges the gavels by turning upon a pivot in rear of its forward edge, in combination with the laterally-projecting cutting apparatus of a two-wheel side-draft machine.

6. The combination, in a two-wheel side-draft machine, of an adjustable cutting apparatus, a tilting platform connected thereto and turning upon a pivot in rear of its forward edge, and a lifting mechanism, in such manner as that said cutting apparatus and platform can be raised for passing obstructions while the machine is in motion.

7. Operating the tilting platform by means of the lever and the chain or cord, in the manner as and for the purpose herein described.

8. The employment of a shield or guard for closing the opening between the finger-bar and forward edge of the platform, formed by the tilting of the platform on a pivot in the rear of its forward edge.

In testimony whereof I have hereunto set my hand this 22d day of March, 1867.

J. W. BOPE.

Witnesses:

EDM. F. BROWN,

CHRIS. JOURGENSEN.